US007005491B2

(12) United States Patent
Weng et al.

(10) Patent No.: US 7,005,491 B2
(45) Date of Patent: Feb. 28, 2006

(54) PROPYLENE DIENE COPOLYMERIZED POLYMERS

(75) Inventors: Weiqing Weng, Houston, TX (US); Eric J. Markel, Kingwood, TX (US); Main Chang, Houston, TX (US); Armenag H. Dekmezian, Kingwood, TX (US); Palanisamy Arjunan, Houston, TX (US); Olivier J. Georjon, Brussels (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 117 days.

(21) Appl. No.: 10/603,042

(22) Filed: Jun. 24, 2003

(65) Prior Publication Data

US 2004/0077806 A1  Apr. 22, 2004

Related U.S. Application Data

(63) Continuation-in-part of application No. 09/458,918, filed on Dec. 10, 1999, now abandoned.

(51) Int. Cl.
*C08F 4/64* (2006.01)
*C08F 36/20* (2006.01)

(52) U.S. Cl. ............... 526/336; 526/160; 526/165; 526/170; 526/339

(58) Field of Classification Search ............... 526/336, 526/339, 160, 165, 170
See application file for complete search history.

(56) References Cited

U.S. PATENT DOCUMENTS

| 3,351,621 A | 11/1967 | Bacskai |
| 4,182,810 A | 1/1980 | Willcox |
| 4,530,914 A | 7/1985 | Ewen et al. |
| 4,542,199 A | 9/1985 | Kaminsky et al. |
| 4,665,208 A | 5/1987 | Welborn, Jr. et al. |
| 4,808,561 A | 2/1989 | Welborn, Jr. |
| 4,871,705 A | 10/1989 | Hoel |
| 4,874,734 A | 10/1989 | Kioka et al. |
| 4,908,463 A | 3/1990 | Bottelberghe |
| 4,921,825 A | 5/1990 | Kioka et al. |
| 4,923,833 A | 5/1990 | Kioka et al. |
| 4,924,018 A | 5/1990 | Bottelberghe |
| 4,933,403 A | 6/1990 | Kaminsky et al. |
| 4,937,299 A | 6/1990 | Ewen et al. |
| 4,948,840 A | 8/1990 | Berta |
| 4,952,540 A | 8/1990 | Kioka et al. |
| 4,968,827 A | 11/1990 | Davis |
| 5,017,714 A | 5/1991 | Welborn, Jr. |
| 5,026,798 A | 6/1991 | Canich |
| 5,047,485 A | 9/1991 | DeNicola, Jr. |
| 5,057,475 A | 10/1991 | Canich et al. |
| 5,091,352 A | 2/1992 | Kioka et al. |
| 5,103,031 A | 4/1992 | Smith, Jr. |
| 5,120,867 A | 6/1992 | Welborn, Jr. |
| 5,145,819 A | 9/1992 | Winter et al. |
| 5,153,157 A | 10/1992 | Hlatky et al. |
| 5,198,401 A | 3/1993 | Turner et al. |
| 5,204,419 A | 4/1993 | Tsutsui et al. |
| 5,206,199 A | 4/1993 | Kioka et al. |
| 5,235,081 A | 8/1993 | Sangokoya |
| 5,239,022 A | 8/1993 | Winter et al. |
| 5,243,001 A | 9/1993 | Winter et al. |
| 5,248,801 A | 9/1993 | Sangokoya |
| 5,262,503 A | 11/1993 | Gotoh |
| 5,274,056 A | 12/1993 | McDaniel et al. |
| 5,276,208 A | 1/1994 | Winter et al. |
| 5,278,119 A | 1/1994 | Turner et al. |
| 5,296,434 A | 3/1994 | Karl et al. |
| 5,304,614 A | 4/1994 | Winter et al. |
| 5,308,815 A | 5/1994 | Sangokoya |
| 5,324,800 A | 6/1994 | Welborn, Jr. et al. |
| 5,329,032 A | 7/1994 | Tran et al. |
| 5,329,033 A | 7/1994 | Spaleck et al. |
| 5,350,723 A | 9/1994 | Neithamer et al. |
| 5,374,752 A | 12/1994 | Winter et al. |
| 5,391,790 A | 2/1995 | Rohrmann et al. |
| 5,416,169 A | 5/1995 | Saito et al. |
| 5,504,171 A | 4/1996 | Etherton et al. |
| 5,510,502 A | 4/1996 | Sugano et al. |

(Continued)

FOREIGN PATENT DOCUMENTS

DE     196 03 438     8/1997

(Continued)

OTHER PUBLICATIONS

Japanese Patent JP 05 194659 A2 (Aug. 3, 1993) Derwent Abstract, "Olefin copolymers with high melt tension and manufacture thereof"—Shinozaki et al., —Mitsui Petrochemical, Japan.

(Continued)

Primary Examiner—Cauxia Lu
(74) Attorney, Agent, or Firm—Paige Schmidt

(57) ABSTRACT

A method of lowering MFR response of a high melt flow rate polymer producing metallocene catalyst is provided. The method includes contacting the metallocene catalyst with a sufficient quantity of α,ω-diene monomer such that when the catalyst composition is contacted with polymerizable reactants under suitable polymerization conditions, the resulting polymer has an MFR rate in the range of 0.1 to 19. Hydrogen and ethylene may also be present in the polymerization. Additionally a catalyst composition is provided which includes a high melt flow rate polymer producing metallocene catalyst and a sufficient quantity of α,ω-diene monomers such that when the catalyst composition is contacted with a monomer under polymerization conditions, the resulting polymer has an MFR rate in the range of 0.1 to 19.

35 Claims, 2 Drawing Sheets

U.S. PATENT DOCUMENTS

| | | | |
|---|---|---|---|
| 5,514,761 A | | 5/1996 | Etherton et al. |
| 5,541,236 A | | 7/1996 | DeNicola, Jr. et al. |
| 5,610,254 A | * | 3/1997 | Sagane et al. ............... 526/282 |
| 5,643,847 A | | 7/1997 | Walzer, Jr. |
| 5,670,595 A | | 9/1997 | Meka et al. |
| 5,672,668 A | | 9/1997 | Winter et al. |
| 5,756,587 A | | 5/1998 | Bettonville et al. |
| 5,986,009 A | | 11/1999 | Thoen et al. |

FOREIGN PATENT DOCUMENTS

| | | |
|---|---|---|
| DE | 196 03 438 A1 | 8/1997 |
| DE | 196 03 439 | 8/1997 |
| DE | 196 03 439 A1 | 8/1997 |
| DE | 196 03 600 | 8/1997 |
| DE | 196 03 600 A1 | 8/1997 |
| EP | 0 279 586 B | 8/1988 |
| EP | 0 449 087 A | 10/1991 |
| EP | 0 449 087 A2 | 10/1991 |
| EP | 0 279 863 B | 10/1992 |
| EP | 0 549 900 B | 7/1993 |
| EP | 0 561 476 A | 9/1993 |
| EP | 0 576 970 B | 1/1994 |
| EP | 0 594 218 B | 4/1994 |
| EP | 0 354 893 B | 11/1994 |
| EP | 0 784 062 | 7/1997 |
| EP | 0 942 017 | 9/1999 |
| EP | 1 008 607 | 6/2000 |
| JP | 0 519 4659 A2 | 8/1993 |
| JP | 0 609 3041 A2 | 4/1994 |
| JP | 0 609 3042 | 4/1994 |
| JP | 07 13 3387 | 5/1995 |
| JP | 07 13 8424 A2 | 5/1995 |
| JP | 07 16 5814 | 6/1995 |
| JP | 07 179687 A2 | 7/1995 |
| JP | 08 092308 A2 | 4/1996 |
| WO | WO 91/098820 | 7/1991 |
| WO | WO 91/17194 | 11/1991 |
| WO | WO 93/14132 | 7/1993 |
| WO | WO 94/03506 | 2/1994 |
| WO | WO 94/10180 | 5/1994 |
| WO | WO 94/21962 | 9/1994 |
| WO | WO 97/36741 | 10/1997 |
| WO | WO 98/49229 | 11/1998 |
| WO | WO 99/11680 | 11/1999 |

OTHER PUBLICATIONS

Japanese Patent JP 06 093041 A2 (Apr. 5, 1994) Derwent Abstract,, "Manufacture of reactive propylene random copolymers free from boiling xylene-insoluble components"—Goto et al.—Mitsubishi Petrochemical, Japan.

Japanese Patent JP 06 093042 A2 (Apr. 5, 1994) Derwent Abstract, "Catalysts and manufacture of propylene random copolymers"—Futamura et al.,—Futamura et al., —Mitsubishi Petrochemical, Japan.

Japanese Patent JP 07 133387 A2 (May 23, 1995) Derwent Abstract, "Propylene polymer compositions with balanced rigidity and impact resistance"—Sugimoto et al., —Mitsui Toatsu Chemicals, Japan.

Japanese Patent JP 07 138424 A2 (May 30, 1995) Derwent Abstract, "Propylene polymer compositions with balanced rigidity"—Sugimoto et al.,—Mitsui Toatsu Chemicals, Japan.

Japanese Patent JP 07165814 A2 (Jun. 27, 1995) Derwent Abstract, "Propylene-Alpha-Omega-Diene copolymers and method for their manufacture"—Sugimoto et al.—Mitsui Toatsu Chemicals, Japan.

Japanese Patent JP 07 179687 A2 (Jul. 18, 1995) Derwent Abstract, "Propylene polymer compositions with good rigidty and impact resistance"—Sugimoto et al.,—Mitsui Toatsu Chemicals, Japan.

Japanese Patent JP 08 092308 A2 (Apr. 9, 1996) Derwent Abstract, "Manufacture of polyolefins with high melting point and stereoregularity"—Sataka et al., Showa Denko KK, Japan.

Naofumi Naga et al., "Copolymerization of propene and noncinjugated diene involving intramolecular cyclization with metallocene/methylaluminoxane"—*Macromolecules* 1999, v. 32. pp. 1348-1355.

Wild et al., "ansa-metallocene derivatives-VII, synthesis and crystal structure of a chiral ansa-zirconocene derivative with ethylene-bridged tetrahydroindenyl ligands" *Journal of Organometallic Chemistry*, v. 288 (1985) pp. 63-67.

Encyclopedia of Chemical Technology, Kirk, et al, Fourth Edition, vol. 17, p. 784-819.

Encyclopedia of Chemical Technology, Kirk, et al, Fourth Edition, vol. 11, p. 730-783.

* cited by examiner

Figure 1. Molecular Weight vs. Diene Concentration
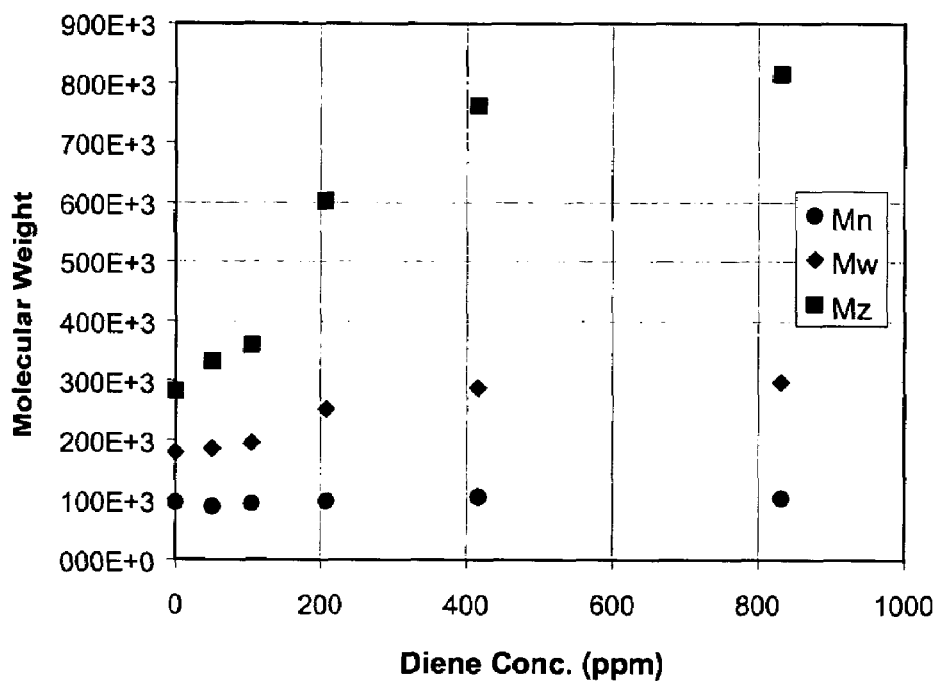
Figure 2. Molecular weight vs. Ethylene Content for Propylene/ethylene Random Copolymers.
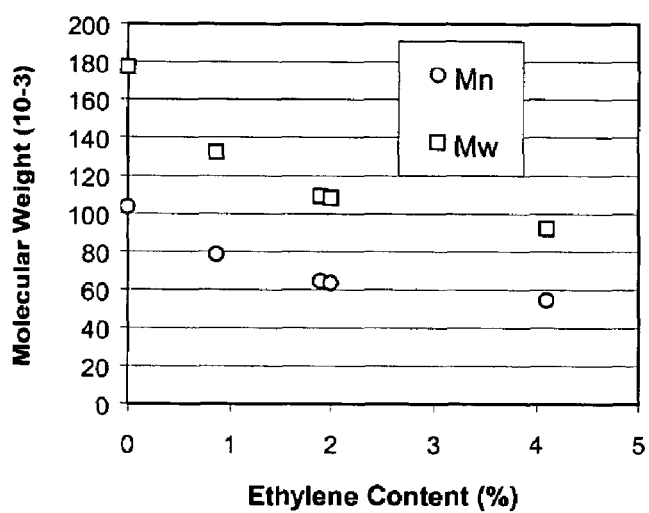

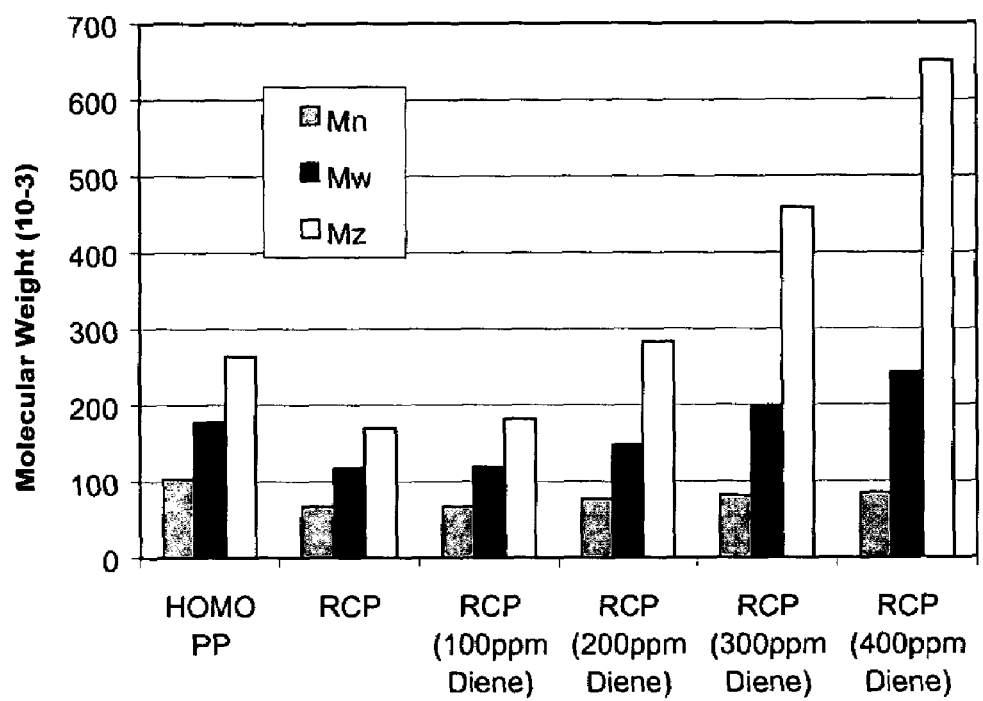
Figure 3. Effect of Diene Incorporation on Molecular Weight

PROPYLENE DIENE COPOLYMERIZED POLYMERS

CROSS REFERENCE TO RELATED APPLICATIONS

This application is a continuation-in-part of application Ser. No. 09/458,918, filed Dec. 10, 1999 now abandoned.

FIELD OF INVENTION

The present invention relates to methods of propylene polymerization. More particularly the invention relates to methods of copolymerizing propylene and diene monomers.

BACKGROUND OF THE INVENTION

Polypropylene is an inexpensive thermoplastic polymer employed in a wide variety of applications, the articles of which include, for example, films, fibers, such as spunbonded and meltblown fibers, fabrics, such as nonwoven fabrics, and molded articles. The selection of polypropylene for any one particular application depends, in part, on the properties of the polypropylene polymer candidate, the fabrication mode or manufacturing process and the final article and its intended uses. Examples of some of these properties include density, molecular weight, molecular weight distribution, melting temperature, and melt flow rate.

The final properties of polypropylene are generally dependent upon the polymerization conditions present during polymer formation. One such polymerization condition is the catalyst. In some instances, while the catalyst selection is an important component in the polymerization reaction, changing other polymerization condition variables in the presence of the same catalyst may produce polypropylenes having different final properties. For example, the addition of hydrogen to a metallocene catalyzed polymerization reaction may increase the catalyst activity. Catalyst activity may be measured by the increase or decrease in the amount of polymer produced during a measured time interval by a measured amount of catalyst. Generally, an increase in catalyst activity results in an increase in the amount of polymer produced by the catalyst over a measured time interval. Producing more polymer with the same catalyst or using less catalyst to produce the same amount of polymer may provide a commercial advantage.

However, there are many instances where the addition of hydrogen not only increases the amount of polymer produced but, in general, may also increases the melt flow rate (MFR) of the polymer. Many manufacturing processes have specific, in not strict, polymer melt flow rate parameters. Generally, high MFR (low molecular weight) polymers are not suitable in many applications. This is so because melting and handling the molten polymer are common steps for converting the polymer into a finished article. As such, a polymer having a high melt flow rate may, upon melting, become too fluid (or lack sufficient viscosity) to be processed into, for example, a foamed article, or an extruded fiber suitable for forming a nonwoven web or a thermoformed article. As such, increasing both polymer production and the polymer's melt flow rate may result in the production of greater quantities of polymer which are unsuitable for many manufacturing processes.

In other instances, it may be desirable that the finished polypropylene article possess a certain level of clarity. In some of these instances, clarity may be achieved by the addition of ethylene to the propylene polymerization process. The incorporation of ethylene into the polypropylene chain tends to break up or otherwise alter the polypropylene crystalline structure. The incorporation of ethylene in some instances may also reduce the molecular weight of the polymer and increase the melt flow rate. Again, because many manufacturing processes have strict melt flow rate parameters, increasing the melt flow rate of the polymer may not be desirable.

Additionally, certain catalysts, and particularly certain metallocene catalysts are suitable for producing polypropylene having a melt flow rate in a range of from greather than 19–2,000. Generally, a catalyst and particularly a metallocene catalyst, capable of producing polypropylene and particularly homopolypropylene having a melt flow rate greater than 19 may be referred to as a high melt flow rate polymer producing catalyst. Polypropylene polymers having a melt flow rate in this range may be useful in some applications, such as fiber spinning, melt blowing, injection molding and hot melt adhesives. If, however, polypropylene having a melt flow rate below this range is desirable, the polymer producer may, in some instances, be required to use a different catalyst. Switching catalyst may not only be expensive but time consuming as well.

Therefore, while it is desirable to improve polymer production and polymer properties, such as clarity, there exist a need to achieve these objectives while remaining compliant with processing melt flow rate parameters. Additionally, there exist a need to expand the melt flow rate capability of high melt flow rate polymer producing catalyst to avoid the associated cost and time inherent in switching catalysts.

SUMMARY OF THE INVENTION

The present invention includes a copolymerization reaction of olefin monomers, desirably propylene monomers, with an $\alpha,\omega$-diene in the presence of hydrogen and/or a comonomer, such as ethylene or butene, and the olefin/$\alpha,\omega$-diene copolymers resulting therefrom. Desirably, the present invention involves a co-polymerization reaction of olefin monomers, wherein the olefin monomers co-polymerized include propylene, ethylene and $\alpha,\omega$-diene monomers.

The present invention further includes a method of lowering the melt flow rate (MFR) response of a high melt flow rate polymer producing metallocene catalyst. The method includes contacting the high melt flow rate polymer producing metallocene catalyst with a sufficient quantity of $\alpha,\omega$-diene monomer such that when the catalyst is contacted with polymerizable reactants, such as propylene monomers, in presence of the $\alpha,\omega$ diene under suitable polymerization conditions, the resulting polymer has an MFR rate in the range of 0.1 to 19 and, optionally an 11% or greater increase in molecular weight distribution. Suitable polymerization conditions may include hydrogen and/or other polymerizable reactants, such as ethylene. Desirably, the metallocene catalyst is a zirconium metallocene catalyst.

In another embodiment, the present invention includes a method of forming a propylene polymer having a MFR in the range of 0.1 to 19. The method includes contacting a high melt flow rate polymer producing metallocene catalyst under suitable polymerization conditions with propylene monomers and $\alpha,\omega$-diene monomers and recovering the propylene polymer. Suitable polymerization conditions may include hydrogen and/or other polymerizable reactants, such as ethylene. Desirably, the metallocene catalyst is a zirconium metallocene catalyst.

In another embodiment, the present invention includes a catalyst composition. The catalyst composition includes a high melt flow rate polymer producing metallocene catalyst and a sufficient quantity of α,ω-diene monomers such that when the catalyst composition is contacted with a monomer under suitable polymerization conditions, the resulting polymer has an MFR rate in the range of 0.1 to 19. The catalyst composition desirably includes a zirconium metallocene.

BRIEF DESCRIPTION OF THE DRAWINGS

FIG. 1 is a plot of Mn, Mw, and Mz vs. diene concentration for Examples 1–6.

FIG. 2 is a plot of Mn and Mw vs. ethylene concentration for Examples 16–20.

FIG. 3 is a plot illustrating the effect of diene incorporation on molecular weight for Examples 21–26.

DETAILED DESCRIPTION OF THE INVENTION

As used herein, the term "high melt flow rate polymer producing catalyst" means a catalyst, desirably a metallocene catalyst, capable of producing polypropylene and particularly homo-polypropylene having a melt flow rate (MFR) greater than 19 under, for example, the following polymerization conditions. A 2-liter autoclave reactor is charged with propylene (1 L), triethylaluminum (1.0 mL of 1 M solution in hexane) and hydrogen (0–10 mmol). Then the reactor is heated to 70° C. and the catalyst is injected into the reactor with 200 mL of propylene. The polymerization reaction is allowed to run for one hour while maintaining the reactor temperature at 70° C. After one hour the reactor is cooled to 25° C. and vented. The polymer product is collected and the MFR measured in accordance with ASTM D-1238 at 230° C. and 2.16 kg load.

As used herein the term "MFR response" means the melt flow rate of polypropylene, and particularly homo-polypropylene, produced by a high melt flow rate polymer producing catalyst under the conditions described in the definition of the term "high melt flow rate polymer producing catalyst".

Ranges are used here and throughout the description of the invention to further define the invention. Unless otherwise stated, it will be understood that these ranges include the recited end point value(s) as well as those values defined by and/or between the recited end point value(s).

In the description of the copolymer, and particularly when describing the constituents of the copolymer, in some instances, monomer terminology may be used. For example, terms such as "olefin", "propylene", "α,ω-diene", "ethylene" and other α-olefins, may be used. It will be understood that when such monomer terminology is used to describe the constituents of the copolymer, such monomer terminology shall mean the polymerized units of such monomers present in the copolymer.

The olefin/α,ω-diene copolymer, and desirably a propylene/α,ω-diene copolymer, includes a co-polymerization reaction product, and desirably a metallocene co-polymerization reaction product, of one or more olefin monomers, wherein one such olefin monomer is propylene and one or more species of α,ω-diene monomers. Desirably, the polymer includes a co-polymerization reaction product, and desirably a metallocene co-polymerization reaction product, of one or more olefin monomers, wherein the olefin monomers are α-olefin monomers, and particularly propylene and ethylene monomers, with one or more species of α,ω-diene monomers.

Methods

The methods described herein produce a diene/α-olefin copolymer. More specifically, these methods produce diene/α-olefin co-polymerization reaction products having lower MFRs and increased molecular weights in comparison to an α-olefin reaction product polymerized under similar conditions. This is achieved by lowering the MFR response of a high melt flow rate polymer producing catalyst. As such, these methods, and particularly the incorporation of dienes during polymerization, expand the MFR response spectrum, and particularly the MFR response spectrum for polypropylene resins, of a high melt flow rate polymer producing metallocene catalyst. By expanding the MFR response spectrum of these high melt flow rate polymer producing metallocene catalysts, the polymer manufacturer may now employ the same catalyst for meeting both high and low MFR product specifications. In this way, costly catalyst switching is avoided.

More particularly, a method of forming a propylene polymer having a MFR in the range of 0.1 to 19 is provided which includes contacting a high melt flow rate polymer producing metallocene catalyst under suitable polymerization conditions with polymerizable reactants, such as propylene monomers, and α,ω-diene monomers and recovering the propylene polymer. Desirably the metallocene catalyst may be a zirconium metallocene catalyst. Additionally, the contacting step may include hydrogen and ethylene monomers. The hydrogen (in parts per million (ppm)) may be present in the range of 100 to 50,000, and desirably from 500 to 20,000 and most desirably from 1,000 to 10,000 as measured as the gas phase concentration in equilibrium with liquid propylene at polymerization temperature. The α,ω-diene monomers may be present in the range of 0.001 to 2 wt % (10 to 20,000 ppm) and desirably from 0.003 to 1.5 wt % and more desirably from 0.005 to 1.0 wt %. The ethylene monomers may be present in the range of 0 to 8 wt % and desirably from 1 to 7 wt % and more desirably from 2 to 6 wt %. The polymerizable reactants may be present in the range of 90 to 99.999 wt % and desirably from 93 to 99.997 wt % and more desirably from 95 to 99.995 wt %.

Additionally, a method is provided for lowering the MFR response of a high melt flow rate polymer producing metallocene catalyst which includes the steps of contacting the metallocene catalyst with a sufficient quantity of α,ω-diene monomer such that when the catalyst composition is contacted with polymerizable reactants under suitable polymerization conditions, the resulting polymer has an MFR rate in the range of 0.1 to 19. The hydrogen may be present in the range of 100 to 50,000 and desirably from 500 to 20,000 and most desirably from 1,000 to 10,000 ppm of the gas phase concentration in equilibrium with liquid propylene at polymerization temperature. The α,ω-diene monomers may be present in the range of 0.001 to 2 wt % and desirably from 0.003 to 1.5 wt % and more desirably from 0.005 to 1.0 wt %. The ethylene monomers may be present in the range of 0 to 8 wt % and desirably from 1 to 7 wt % and more desirably from 2 to 6 wt %. The polymerizable reactants may be present in the range of 90 to 99.999 wt % and desirably from 93 to 99.997 wt % and more desirably from 95 to 99.995 wt %.

Additionally, a catalyst composition is provided which includes a high melt flow rate polymer producing metallocene catalyst and a sufficient quantity of α,ω-diene monomers such that when the catalyst composition is contacted with a monomer under suitable polymerization conditions, the resulting polymer has an MFR rate in the range of 0.1 to 19. The α,ω-diene monomers may be present in the range of 0.1 to 99.7 wt % and desirably from 0.3 to 99.5 wt % and more desirably from 0.5 to 99.3 wt %. The metallocene catalyst may be present in the range of 99.9 to 0.3 wt % and desirably from 99.7 to 0.5 wt % and more desirably from 99.5 to 0.7 wt %.

Polymerization

The copolymer, which is the co-polymerization reaction product of α,ω-diene and olefin(s) may desirably be prepared by slurry polymerization of the olefins and the diene under conditions in which the catalyst site remains relatively insoluble and/or immobile so that the polymer chains are rapidly immobilized following their formation. Such immobilization is affected, for example, by (1) using a solid, insoluble catalyst, (2) conducting the copolymerization in a medium in which the resulting copolymer is generally insoluble, and (3) maintaining the polymerization reactants and products below the crystalline melting point of the copolymer.

Generally, the metallocene supported catalyst compositions described below, and in greater detail in the Examples, are desirable for co-polymerizing α,ω-dienes and olefins. The polymerization processes suitable for co-polymerizing α,ω-dienes and olefins, and particularly α-olefins, are well known by those skilled in the art and include solution polymerization, slurry polymerization, and low pressure gas phase polymerization. Metallocene supported catalysts compositions are particularly useful in the known operating modes employing fixed-bed, moving-bed, fluid-bed, or slurry processes conducted in single, series or parallel reactors.

Generally, any of the above polymerization process may be used. When propylene is the selected olefin, a common propylene polymerization process is one that is conducted using a slurry process in which the polymerization medium can be either a liquid monomer, like propylene, or a hydrocarbon solvent or diluent, advantageously aliphatic paraffin such as propane, isobutane, hexane, heptane, cyclohexane, etc. or an aromatic diluent such as toluene. In this instance, the polymerization temperatures may be those considered low, e.g., less than 50° C., desirably 0° C.–30° C., or may be in a higher range, such as up to about 150° C., desirably from 50° C. up to about 80° C., or at any ranges between the end points indicated. Pressures can vary from about 100 to about 700 psia (0.69–4.8 MPa). Additional description is given in U.S. Pat. Nos. 5,274,056 and 4,182,810 and WO 94/21962 which are each fully incorporated by reference.

Pre-polymerization may also be used for further control of polymer particle morphology in typical slurry or gas phase reaction processes in accordance with conventional teachings. For example, this can be accomplished by pre-polymerizing a C2–C6 alpha-olefin, or copolymerizing C2–C6 alpha-olefins and suitable α,ω-dienes, for a limited time. For example, ethylene may be contacted with the supported metallocene catalyst composition at a temperature of −15 to 30° C. and ethylene pressure of up to about 250 psig (1724 kPa) for 75 min. to obtain a polyethylene coating on the support. The pre-polymerized catalyst is then available for use in the polymerization processes referred to above. In a similar manner, the activated catalyst on a support coated with a previously polymerized polymer can be utilized in these polymerization processes.

Additionally it is desirable to reduce or eliminate polymerization poisons that may be introduced via feedstreams, solvents or diluents, by removing or neutralizing the poisons. For example, monomer feed streams or the reaction diluent may be pre-treated, or treated in situ during the polymerization reaction, with a suitable scavenging agent. Typically such will be an organometallic compound employed in processes such as those using the Group-13 organometallic compounds described in U.S. Pat. No. 5,153,157 and WO-A-91/09882 and WO-A-94/03506, noted above, and that of WO-A-93/14132.

Polymerizable Reactants

Suitable polymerizable reactants include ethylene, C2–C10 α-olefins or diolefins. Examples of α-olefins include, for example, propylene, butene-1, pentene-1, hexene-1, heptene-1, 4-methyl-1-pentene, 4-methyl-1-hexene, 5-methyl-1-hexene, 1-octene, 1-decene, 1-undecene, 1-dodecene and the like. In addition, mixtures of these and other α-olefins may also be used, such as, for example, propylene and ethylene as well as monomer combinations from which elastomers are formed. Ethylene, propylene, styrene and butene-1 from which crystallizable polyolefins may be formed are particularly desirable.

Dienes

Examples of suitable α,ω-diene species include α,ω-dienes that contain at least 7 carbon atoms and have up to about 30 carbon atoms, more suitably are α,ω-dienes that contain from 8 to 12 carbon atoms. Representative examples of such α,ω-dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and the like. Additionally, α,ω-dienes containing aliphatic, cyclic or aromatic substituents may also be used. Of these, 1,7-octadiene, and 1,9-decadiene are more desirable, particularly desirable is 1,9-decadiene. The diene content can be estimated, for example, by measuring absorbance at 722 cm-1 using infrared spectroscopy.

Catalyst System

Metallocenes: As used herein "metallocene" and "metallocene component" refer generally to compounds represented by the formula CpmMRnXq wherein Cp is a cyclopentadienyl ring which may be substituted, or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Methods for making and using metallocenes are very well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; and 5,391,790 each fully incorporated herein by reference.

Methods for preparing metallocenes are fully described in the Journal of Organometallic Chem., volume 288, (1985), pages 63–67, and in EP-A-320762, both of which are herein fully incorporated by reference.

Metallocene catalyst components are described in detail in U.S. Pat. Nos. 5,145,819; 5,243,001; 5,239,022; 5,329,033; 5,296,434; 5,276,208; 5,672,668; 5,304,614; 5,374,752; 5,240,217; 5,510,502 and 5,643,847; and EP 549 900 and 576 970 all of which are herein fully incorporated by reference.

Illustrative but non-limiting examples of desirable metallocenes include:

Dimethylsilanylbis(2-methyl-4-phenyl-1-indenyl)ZrCl$_2$;
Dimethylsilanylbis(2-methyl-4,6-diisopropylindenyl)ZrCl$_2$;

Dimethylsilanylbis(2-ethyl-4-phenyl-1-indenyl)ZrCl$_2$;
Dimethylsilanylbis(2-ethyl-4-naphthyl-1-indenyl)ZrCl$_2$,
Phenyl(Methyl)silanylbis(2-methyl-4-phenyl-1-indenyl) ZrCl$_2$
Dimethylsilanylbis(2-methyl-4-(1-naphthyl)-1-indenyl) ZrCl$_2$,
Dimethylsilanylbis(2-methyl-4-(2-naphthyl)-1-indenyl) ZrCl$_2$,
Dimethylsilanylbis(2-methyl-indenyl)ZrCl$_2$,
Dimethylsilanylbis(2-methyl-4,5-diisopropyl-1-indenyl) ZrCl$_2$,
Dimethylsilanylbis(2,4,6-trimethyl-1-indenyl)ZrCl$_2$,
Phenyl(Methyl)silanylbis(2-methyl-4,6-diisopropyl-1-indenyl)ZrCl$_2$,
1,2-Ethandiylbis(2-methyl-4,6-diisopropyl-1-indenyl) ZrCl$_2$,
1,2-Butandiylbis(2-methyl-4,6-diisopropyl-1-indenyl) ZrCl$_2$,
Dimethylsilanylbis(2-methyl-4-ethyl-1-indenyl)ZrCl$_2$,
Dimethylsilanylbis(2-methyl-4-isopropyl-1-indenyl)ZrCl$_2$,
Dimethylsilanylbis(2-methyl-4-t-butyl-1-indenyl)ZrCl$_2$,
Phenyl(Methyl)silanylbis(2-methyl-4-isopropyl-1-indenyl) ZrCl$_2$,
Dimethylsilanylbis(2-ethyl-4-methyl-1-indenyl)ZrCl$_2$,
Dimethylsilanylbis(2,4-dimethyl-1-indenyl)ZrCl$_2$,
Dimethylsilanylbis(2-methyl-4-ethyl-1-indenyl)ZrCl$_2$,
Dimethylsilanylbis(2-methyl-1-indenyl)ZrCl$_2$.

Generally, the racemic isomer of these metallocenes are used to produce stereo specific polymers, such as isotatic polypropylene. However, mixtures of meso and racemic metallocenes may be used to produce polypropylene blends which include amorphous and crystalline components that are useful as thermoplastic elastomers and adhesive compositions. In these instances, the amorphous component of the blend may include lower molecular weight species as compared to the species present in the crystalline component. In some elastomer and/or adhesive application, these lower molecular weight species may not be desirable. However, when such mixtures of meso and racemic metallocenes are used to copolymerize propylene in the presence of one or more of the above described α,ω-dienes, the molecular weight of the amorphous component would be expected to increase, thus reducing the presence in the amorphous component of the undesirable lower molecular weight species. In these instances, propylene may also be polymerized with ethylene and other α-olefins, such as those described above.

Activators: Metallocenes are generally used in combination with some form of activator. Alkylalumoxanes may be used as activators, most desirably methylalumoxane (MAO). Preferred alumoxanes include modified alumoxanes, preferably modified methyl alumoxane. Another preferred alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584). There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,103,031 and EP-A-0 561 476, EP-B1–0 279 586, EP-A-0 594–218 and WO94/10180, each fully incorporated herein by reference. Activators may also include those comprising or capable of forming non-coordinating anions along with catalytically active metallocene cations. Compounds or complexes of fluoro aryl-substituted boron and aluminum are particularly suitable, see, e.g., U.S. Pat. Nos. 5,198,401; 5,278,119; and 5,643,847.

Support Materials: The catalyst compositions used in the process of this invention may optionally be supported using a porous particulate material, such as for example, talc, inorganic oxides, inorganic chlorides and resinous materials such as polyolefin or polymeric compounds.

Desirably, the support materials are porous inorganic oxide materials, which include those from the Periodic Table of Elements of Groups 2, 3, 4, 5, 13 or 14 metal oxides. Silica, alumina, silica-alumina, and mixtures thereof are particularly desirable. Other inorganic oxides that may be employed either alone or in combination with the silica, alumina or silica-alumina are magnesia, titania, zirconia, and the like.

A particularly desirable support material is particulate silicon dioxide. Particulate silicon dioxide materials are well known and are commercially available from a number of commercial suppliers. Desirably the silicon dioxide used herein is porous and has a surface area in the range of from about 10 to about 700 m2/g, a total pore volume in the range of from about 0.1 to about 4.0 cc/g and an average particle diameter in the range of from about 10 to about 500 μm. More desirably, the surface area is in the range of from about 50 to about 500 m2/g, the pore volume is in the range of from about 0.5 to about 3.5 cc/g and the average particle diameter is in the range of from about 15 to about 150 μm. Most desirably the surface area is in the range of from about 100 to about 400 m2/g, the pore volume is in the range of from about 0.8 to about 3.0 cc/g and the average particle diameter is in the range of from about 20 to about 100 μm. The average pore diameter of typical porous silicon dioxide support materials is in the range of from about 10 to about 1000 Å. Desirably, the support material has an average pore diameter of from about 50 to about 500 Å, and most desirably from about 75 to about 350 Å. Desirably, supports suitable for use in this invention include talc, clay, silica, alumina, magnesia, zirconia, iron oxides, boria, calcium oxide, zinc oxide, barium oxide, thoria, aluminum phosphate gel, polyvinylchloride and substituted polystyrene and mixtures thereof.

The supported catalyst composition may be used directly in polymerization or the catalyst composition may be pre-polymerized using methods well known in the art. For details regarding prepolymerization, see U.S. Pat. Nos. 4,923,833; 4,921,825; and 5,643,847; and EP 279 863 and EP 354 893 (each fully incorporated herein by reference).

Modifiers

Modifiers may be those commonly employed with plastics. Examples include one or more of the following: heat stabilizers or antioxidants, neutralizers, slip agents, antiblock agents, pigments, antifogging agents, antistatic agents, clarifiers, nucleating agents, ultraviolet absorbers or light stabilizers, fillers, hydrocarbon resins, rosins or rosin esters, waxes, additional plasticizers and other additives in conventional amounts. Effective levels are known in the art and depend on the details of the base polymers, the fabrication mode and the end application. In addition, hydrogenated and/or petroleum hydrocarbon resins and other plasticizers may be used as modifiers.

Propylene/α,ω-diene Copolymer

Generally, the polymerized olefin units are present in the copolymer in the range from 90 weight percent (wt %) to 99.99 wt % of the copolymer. The polymerized α,ω-diene units are present in the copolymer in the range from 0.001 wt % to 2 wt % of the copolymer. Desirably the α,ω-diene(s) are present in the range from 0.005 wt % to 1.5 wt % and more desirably in the range from 0.005 wt % to 1.0 wt % of the copolymer.

When two or more olefins are present, desirably one of the olefins is propylene, which may be present in copolymer in the range from 90.05 wt % to 99.99 wt % of the copolymer. The other olefin(s), one of which is desirably ethylene, may be present in the copolymer in the range from 0.05 wt % to 8 wt %, and desirably in the range from 0.1 wt % to 6 wt % and more desirably in the range from 0.5 wt % to 3 wt % of the copolymer. The α,ω-diene(s) are present in the copolymer in the range from 0.001 wt % to 2 wt % of the copolymer. Desirably the α,ω-diene(s) are present in the range from 0.005 wt % to 1.5 wt % and more desirably in the range from 0.005 wt % to 1.0 wt % of the copolymer.

Still more desirably, the copolymer includes: propylene in the range from 90 wt % to 99.99 wt % of the copolymer; C2 or other α-olefin(s) in the range from 0.00 wt % to 8 wt %, desirably in the range from 0.05 to 6 wt % and more desirably in the range from 0.5 wt % to 3 wt % of the copolymer; the α,ω-diene(s) are present in the copolymer in the range from 0.001 wt % to 2 wt %, desirably in the range from 0.005 wt % to 1.5 wt % and more desirably in the range from 0.005 wt % to 1.0 wt % of the copolymer.

The copolymer has a weight average molecular weight in the range from 30,000 to 2,000,000, desirably from 70,000 to 1,000,000 and even more desirably from 100,000 to 750,000. The copolymer has a molecular weight distribution (MWD) in the range from 1.7 to 6.0, desirably from 2.0 to 5.0 and even more desirably from 2.0 to 4.0.

The copolymer may have a melt flow rate (MFR) in the range of from 0.1 dg/min to 19 dg/min, desirably from 0.5 dg/min to 15 dg/min, even more desirably from 1.0 dg/min to 10 dg/min and, even more desirably from 1.0 dg/min to 8 dg/min and, and even more desirably from 1.0 dg/min to 5 dg/min. MFR is determined according to ASTM D-1238, condition L (2.16 kg, 230° C.). The melting point of the copolymer may be less than 165° C., and desirably less than 160° C. Upper limits for melting point depend on the specific application but would typically not be higher than 165° C. The hexane extractable level (as measured by 21 CFR 177.1520(d)(3)(i)) of the copolymer may be less than 2.0 wt %, and desirably less than 1.0 wt %.

The copolymer may include blends, including reactor blends of α-olefins and particularly homopolymers and blends, including reactor blends of polypropylene and particularly metallocene catalyzed polypropylene.

The copolymer may further be described as "branched". As used herein, the term "branched" means one or more α,ω-diene linkages, desirably at the α,ω positions of the α,ω-diene, between one or more polymer chains formed by the polymerization of one or more α-olefins.

The copolymer may be blended with other polymers, particularly with other polyolefins. Specific examples of such polyolefins include, but are not limited to ethylene-propylene rubber, ethylene-propylene diene rubber, dynamically vulcanized alloys, adhesive compositions and ethylene plastomers. Specific examples of commercially available ethylene plastomers include EXACT™ resins products of Exxon Chemical Company and, AFFINITY™ resins and ENGAGE™ resins, products of Dow Chemical Company.

These copolymer may be employed in a wide variety of applications, the articles of which include, for example, films, fibers, such as spunbonded and meltblown fibers, fabrics, such as nonwoven fabrics, molded articles, and as blend components (also known as modifiers). More particularly, these articles include, for example, cast films, oriented films, injection molded articles, blow molded articles, foamed articles and thermoformed articles.

The propylene/α,ω-diene copolymers recovered by the methods of this invention are generally suitable in the applications such as thermoforming, blow molding, foaming, fibers, fabrics and blown film. Specific examples of these applications include thermoformed articles, dairy containers, biaxial oriented films and insulation materials. Examples of other methods and applications for making polypropylene and for which polypropylene may be useful are described in the Encyclopedia of Chemical Technology, by Kirk-Othmer, Fourth Edition, vol. 17, at pages 748–819, which are incorporated by reference herein. Examples of other applications for which foamed plastic, such as foamed polypropylene, are useful may be found in Encyclopedia of Chemical Technology, by Kirk-Othmer, Fourth Edition, vol. 11, at pages 730–783, which are incorporated by reference herein.

In the case of propylene random copolymers (RCP), such as propylene/ethylene, diene incorporation during polymerization may produce RCP resins suitable in applications such as films and injection molded medical devices. Specific examples of these applications include syringes, pill-bottles, cast film, such as cast film for packaging, containers and films for low temperature uses.

EXAMPLES

General

Polymerization grade propylene monomers were purified by passing first through basic alumina activated at 600° C., followed by molecular sieves activated at 600° C. 1,9-decadiene (96%), and 1,5-hexadiene were purchased from Aldrich Chemical Co. and used as received.

Melt flow rate (MFR) of the polymers was measured using ASTM D-1238 at 230° C. and 2.16 kg load. Molecular weight of the polymers was analyzed by GPC using Waters 150C high temperature system with a DRI detector and Showdex AT-806MS column. Melting and crystallization temperatures of the polymers were measured on a TA Instrument DSC-912 using a heating and cooling rate of 10° C./min with a starting temperature of 0° C. and a stopping temperature of 250° C. The melting temperatures reported were obtained from the second melt.

Molecular weight of the polymers was analyzed by GPC using Waters 150C high temperature system with a DRI detector and Showdex AT-806MS column. Melting and crystallization temperatures of the polymers were measured on a TA Instrument DSC-912 using a heating and cooling rate of 10° C./min. The melting temperatures reported were obtained from the second melt. The mechanical properties were measured using ASTM-1708 microtensile testing procedure. Recoverable compliance was measured in a Rheometrics Dynamic Stress Rheometer (DSR). Catalyst Preparation Catalyst A Preparation All catalyst preparations were performed in an inert atmosphere with <1.5 ppm H2O content. The metallocenes were obtained from internal sources. The silica support, "MS 948", was purchased from Grace Davison Inc., and calcined at 600° C. under a dry nitrogen flow for 8–24 hours to achieve a hydroxyl content of 0.8 to 1.2 mmol/g silica.

In a nitrogen purged dry glove box, the metallocene, dimethylsilylbis(2-methyl indenyl)zirconium dichloride (0.105 g, 0.220 mmole) was weighed into a 100 mL beaker.

Methylalumoxane (MAO, 9.30 g, 30% in toluene) was added to the beaker. The mixture was stirred for 1 hour to dissolve and activate the metallocene. After 1 hour, the activated metallocene solution was diluted with 20 g of toluene and added slowly to the pre-calcined silica (MS948, 10.00 g) with manual mix until an uniform colored slurry was obtained. The slurry was transferred to a 250 mL flask connected to a rotovap. Solvent was removed by gradually reducing of pressure and the catalyst was dried under vacuum. Loading: 0.022 mmol of transition metal and 4.8 mmol of Al per gram of silica. Catalyst A was stored in mineral oil (approximately 20 wt % in oil).

Examples 1–6

The copolymerization of propylene monomers in the presence of Catalyst A in Examples 1–6 illustrate that low concentration of 1,9-decadiene (1,9-DD) lowers the MFR of the polyolefins as compared to polymerization of propylene monomers in the absence of 1,9-decadiene (polypropylene control).

Table I summarizes some characterization data of diene modified polypropylene. The polypropylene samples with MFR of 2 were made at diene concentration below 0.02 mol % (400 ppm, v/v). The MFR of the polypropylene control sample was 20. As such, a ten-fold reduction in MFR was achieved. At these diene concentrations, gelation (crosslinking) was essentially not detectable by an extraction test.

significantly while Mn remains relatively constant. The resulting polymers have a broadened MWD relative to the control.

Examples 7–9

In Examples 7–9, 1,5 hexadiene was copolymerized with propylene using Catalyst A in a polymerization process similar to the process described in Examples 1–6. Table II shows incorporation of 1,5-hexadiene as evidenced by the reduction in the MFR of the resulting polypropylenes with increasing of diene concentration.

Polymerization—Polymerization grade propylene was supplied directly in a nitrogen-jacketed line and purified by passing through activated basic alumina and molecular sieves. Polymerization was conducted in a 2-liter autoclave reactor. The reactor was charged with triethylaluminum (1.0 mL of 1M solution in hexane), and 1,5-hexadiene. Propylene (1 L) was added and reactor contents were stirred at 750 RPM. Then Catalyst A (750 mg, 18.1 wt % in mineral oil, pre-loaded in a catalyst tube) was injected with propylene (200 mL). The reactor was heated to 70° C., and stirring was kept at 750 RPM. After 60 min, the reactor was cooled to 25° C. and vented. The polymer was collected. Table II reports the process conditions and other data for Examples 6–9.

TABLE I

|  | Example | | | | | |
| --- | --- | --- | --- | --- | --- | --- |
|  | 1 | 2 | 3 | 4 | 5 | 6 |
| Temp (° C.) | 70 | 70 | 70 | 70 | 70 | 70 |
| Propylene (mL) | 1200 | 1200 | 1200 | 1200 | 1200 | 1200 |
| H2 (mmol) | 0 | 0 | 0 | 0 | 0 | 0 |
| Catalyst A (mg) | 100 | 100 | 100 | 100 | 100 | 100 |
| 1,9-decadiene (ppm) | 0 | 50 | 104 | 208 | 416 | 832 |
| MFR g/10 min) | 19.6 | 16 | 18 | 9.8 | 1.7 | 3.5 |
| GPC | | | | | | |
| Mn | 95,284 | 88,849 | 93,653 | 97,808 | 105,619 | 103,260 |
| Mw | 179,536 | 185,955 | 195,283 | 252,711 | 288,483 | 297,803 |
| MWD | 1.88 | 2.09 | 2.09 | 2.58 | 2.73 | 2.88 |
| Mz | 282,676 | 332,049 | 359,632 | 602,404 | 763,053 | 814,912 |
| Mz/Mw | 1.57 | 1.79 | 1.84 | 2.38 | 2.65 | 2.74 |
| Mz + 1 | 424,240 | 570,994 | 611,686 | 1,231,715 | 1,463,951 | 1,552,720 |
| Mz + 1/Mw | 2.36 | 3.07 | 3.13 | 4.87 | 5.07 | 5.21 |
| DSC | | | | | | |
| Melt (° C.) | 147.7 | 148.3 | 145.6 | 147.7 | 147.6 | 148.7 |
| Recrystal. (° C.) | 109.5 | 108 | 108.9 | 111.1 | 111.6 | 112.3 |

Polymerization

Polymerization grade propylene was supplied directly in a nitrogen-jacketed line and purified by passing through activated basic alumina and molecular sieves. Polymerization was conducted in a 2-liter autoclave reactor. The reactor was charged with triethylaluminum (1.0 mL of 1M solution in hexane), and 1,9-decadiene. Propylene (1 L) was added and reactor contents were stirred at 550 RPM. Catalyst A (550 mg, 18.1 wt % in mineral oil, pre-loaded in a catalyst tube) was injected with propylene (200 mL). The reactor was heated to 70° C., and stirring was kept at 550 RPM. After 60 min, the reactor was cooled to 25° C. and vented. The polymer was collected and dried in air for 12 hours. FIG. 1 illustrates the Mn, Mw, and Mz versus diene concentration. Upon addition of diene, Mw and Mz increase

TABLE II

|  | Example | | |
| --- | --- | --- | --- |
|  | 7 | 8 | 9 |
| Temp (° C.) | 70 | 70 | 70 |
| Propylene (mL) | 1200 | 1200 | 1200 |
| H2 (mmol) | 0 | 0 | 0 |
| Catalyst A (mg) | 135 | 135 | 135 |
| 1,5-hexadiene (ppm) | 0 | 667 | 833 |
| MFR (g/10 min) | 30.5 | 4.5 | Gelled |
| DSC | * | * | * |
| Melt (° C.) | * | 150.7 | * |
| Recrystal. (° C.) | * | 112.7 | * |

*—Not Measured

Examples 10–15

Examples 10–15 illustrate copolymerization of propylene monomers with low levels of 1,9-decadiene in the presence of hydrogen. The data in Table III illustrate an increase in catalyst activity/productivity and a decrease in MFR (increase in molecular weight) of the propylene-diene copolymers produced in the presence of hydrogen and 1,9-decadiene compared to propylene polymers produced in the absence of hydrogen and 1,9-decadiene.

Polymerization

Polymerization grade propylene was supplied directly into a nitrogen-jacketed line and purified by passing through activated basic alumina and molecular sieves. Polymerization was conducted in a 2-liter autoclave reactor that was charged with triethylaluminum (1.0 mL of 1M solution in hexane), hydrogen and 1,9-decadiene. Propylene (1.0 L) was added, and while the contents of the reactor were stirred at 550 rpm, 200 mg of Catalyst A (20 wt % in mineral oil, pre-loaded in a catalyst tube) was injected with propylene (200 mL). The reactor was heated to 70° C. The polymerization was terminated by cooling the reactor to 25° C. and venting the propylene. The polymer was collected and dried in air for 12 hours.

TABLE III

| | Example | | | | | |
|---|---|---|---|---|---|---|
| | 10 | 11 | 12 | 13 | 14 | 15 |
| Temp (° C.) | 70 | 70 | 70 | 70 | 70 | 70 |
| Propylene (mL) | 1200 | 1200 | 1200 | 1200 | 1200 | 1200 |
| $H_2$ (mmol) | 0 | 6.6 | 6.6 | 0 | 6.6 | 6.6 |
| Catalyst A (mg) | 200 | 202 | 192 | 200 | 200 | 200 |
| 1,9-decadiene (ppm) | 0 | 0 | 300 | 0 | 0 | 300 |
| Polymn. Time (min) | 30 | 35 | 30 | 15 | 15 | 15 |
| Polymer yield (g) | 112.5 | 211.5 | 154.4 | 15 | 64 | 60 |
| Cat. Activity (g/g · h) | 1120 | 1795 | 1608 | 300 | 1280 | 1200 |
| MFR (g/10 min) | 35 | 75 | 8.5 | 35 | 78 | 19 |

Propylene random copolymers (RCP) are typically made through random incorporation of a comonomer (ethylene or butene, up to 6 wt %) into polypropylene chain. However, unlike conventional Zieglar-Natta (ZN) catalysts, when metallocene catalysts are used to make RCPs, the molecular weight of the polymer decreases significantly upon addition of ethylene comonomer. The reduction of molecular weight may limit the use of some metallocene catalysts in making RCPs. This is so because lowering of molecular weight due to ethylene incorporation would make the resulting RCP unsuitable for many applications.

Examples 16–20

Examples 16–20 illustrate the copolymerization of propylene monomers and ethylene monomers to form a RCP. As expected, the melting point and molecular weight of the RCP decreases with increased ethylene content. Note that a significant decrease of ~40% of molecular weight occurs upon incorporation of 2 wt % of ethylene (See Table IV and FIG. 2). Decreasing the molecular weight (increasing the MFR) is generally not desirable for applications requiring low MFR materials.

Polymerization

Polymerization grade propylene and ethylene were supplied directly in a nitrogen-jacketed line and purified by passing through activated basic alumina and molecular sieves. Polymerization was conducted in a 2-liter autoclave reactor. The reactor was charged with triethylaluminum (1.0 mL of 1M solution in hexane). Propylene (800 cc) was added. The reactor was heated to 60° C. and equilibrated with stirring at 550 RPM. Ethylene was introduced into reactor to give a desired pressure increase ($\Delta P$). Catalyst A (100 mg, 20 wt % in mineral oil, pre-loaded in a catalyst tube) was injected with propylene (200 mL). The polymerization was kept for 60 min, and the reactor was cooled to 25° C. and vented. The polymer was collected and dried in air for 12 hours.

TABLE IV

| | Example | | | | |
|---|---|---|---|---|---|
| | 16 | 17 | 18 | 19 | 20 |
| Temp (° C.) | 60 | 60 | 60 | 60 | 60 |
| Propylene (mL) | 1000 | 1000 | 1000 | 1000 | 1000 |
| Ethylene (mL) | 0 | 3 | 3 | 5 | 7 |
| H2 (mmol) | 0 | 0 | 0 | 0 | 0 |
| Catalyst A (mg) | 100 | 100 | 100 | 100 | 100 |
| FT-IR | | | | | |
| Ethylene content (wt %) | 0.0 | 0.9 | 1.9 | 2 | 4.1 |
| GPC | | | | | |
| Mn | 103,112 | 78,691 | 64,341 | 62,811 | 54,033 |
| Mw | 177,210 | 132,873 | 108,617 | 108,454 | 92,427 |
| MWD | 1.72 | 1.69 | 1.69 | 1.73 | 1.71 |
| Mz | 264,463 | 198,755 | 156,261 | 157,203 | 133,073 |
| Mz/Mw | 1.49 | 1.50 | 1.44 | 1.45 | 1.44 |
| DSC | | | | | |
| Melt (° C.) | 148.4 | 140.4 | 131.8 | 131.6 | 120.3 |
| Recrystal. (° C.) | 110.8 | 101.3 | 93.7 | 95.6 | 84.1 |

Examples 21–26

Examples 21–26 illustrate the copolymerization of propylene monomers with ethylene monomers in the presence of small amounts of 1,9-decadiene (1,9-DD). The results are reported in Table V. The incorporation 100–400 ppm of diene effectively increased the molecular weight, especially Mw and Mz, of the RCP. The RCP sample made at diene concentration of 200 ppm had Mw similar to the homo polypropylene polymer of Example 21. Increasing the diene level led to a further increase of molecular weight. Therefore, the loss of molecular weight in RCP due to the introduction of ethylene can be recovered by the incorporation of diene. It was further noted that at these diene concentrations, gelation (crosslinking) was essentially not detectable in an extraction test.

Polymerization

Polymerization grade propylene and ethylene were supplied directly in a nitrogen-jacketed line and purified by passing through activated basic alumina and molecular sieves. Polymerization was conducted in a 2-liter autoclave reactor. The reactor was charged with triethylaluminum (1.0 mL of 1M solution in hexane), and 1,9-decadiene. Propylene (800 cc) was added. The reactor was heated to 60° C. and equilibrated with stirring at 550 RPM. Ethylene was introduced into reactor to give a desired □P. Catalyst A (500 mg, 20 wt % in mineral oil, pre-loaded in a catalyst tube) was injected with propylene (200 mL). The polymerization was kept for 60 min, and the reactor was cooled to 25° C. and vented. The polymer was collected and dried in air for 12 hours.

Characterization results are summarized and compared in Table V. The Mn, Mw, and Mz are plotted in FIG. 3. Note that upon incorporation of 200–300 ppm of diene, MFR returns to substantially the same level of homopolypropylene. The decrease of molecular weight due to ethylene is substantially recovered.

Referring now to FIG. 3, it is apparent that upon addition of diene, Mw and Mz increase significantly while Mn remains relatively constant indicating that the copolymerized RCP polymers have a broadened molecular weight distribution (MWD). Such polymers are expected to show not only enhanced physical and melt properties but also improved processability.

While the present invention has been described and illustrated by reference to particular embodiments, it will be appreciated by those of ordinary skill in the art that the invention lends itself to many different variations not illustrated herein. For these reasons, then, reference should be made solely to the appended claims for purposes of determining the true scope of the present invention.

Although the appendant claims have single appendencies in accordance with U.S. patent practice, each of the features in any of the appendant claims can be combined with each of the features of other appendant claims or the main claim.

The invention claimed is:

1. A method of lowering melt-flow-rate ("MFR") response of a high-melt-flow-rate-polymer-producing metallocene catalyst comprising contacting the metallocene catalyst with a sufficient quantity of $\alpha,\omega$-diene monomer such that when the catalyst composition is contacted with polymerizable reactants under suitable polymerization conditions, the resulting polymer has
   an MFR in the range of 0.1 to 19 g/10 min.

2. The method of claim 1 wherein the $\alpha,\omega$-diene is present in the range of 10 to 20,000 ppm of the polymerizable reactants.

3. The method of claim 1 wherein the metallocene catalyst is further defined as a zirconium metallocene catalyst.

4. The method of claim 1 wherein the polymerizable reactants are propylene monomers.

5. The method of claim 1 wherein the polymerization conditions are further defined as slurry polymerization conditions.

6. The method of claim 1 wherein the polymerization conditions further includes the presence of hydrogen.

TABLE V

|  | Example | | | | | |
| --- | --- | --- | --- | --- | --- | --- |
|  | 21 | 22 | 23 | 24 | 25 | 26 |
| Temp (° C.) | 60 | 60 | 60 | 60 | 60 | 60 |
| Propylene (mL) | 1000 | 1000 | 1000 | 1000 | 1000 | 1000 |
| Ethylene (mL) | 0 | 5 | 5 | 5 | 5 | 5 |
| H2 (mmol) | 0 | 0 | 0 | 0 | 0 | 0 |
| Catalyst A (mg) | 100 | 100 | 100 | 100 | 100 | 100 |
| 1,9-decadiene (ppm) | 0 | 0 | 100 | 200 | 300 | 400 |
| FT-IR |  |  |  |  |  |  |
| Ethylene content (wt %) | 0 | 1.4 | 2 | 1.6 | 1.3 | 1.3 |
| MFR (g/10 min) | 14.7 | 70.9 | 80.0 | 46.4 | 16.6 | 2.8 |
| GPC |  |  |  |  |  |  |
| Mn | 103,112 | 67,316 | 67,195 | 71,558 | 81,433 | 83,612 |
| Mw | 177,210 | 117,363 | 119,038 | 147,501 | 197,914 | 242,161 |
| MWD | 1.72 | 1.74 | 1.77 | 2.06 | 2.43 | 2.90 |
| Mz | 264,463 | 169,736 | 181,501 | 283,338 | 458,998 | 649,635 |
| Mz/Mw | 1.49 | 1.45 | 1.52 | 1.92 | 2.32 | 2.68 |
| DSC |  |  |  |  |  |  |
| Melt (° C.) | 148.4 | 135.6 | 132.8 | 135.1 | 137.3 | 139.9 |
| Recrystal. (° C.) | 110.8 | 96.2 | 94.3 | 96.1 | 98.3 | 100.7 |

7. A method of lowering melt-flow-rate ("MFR") response of a high-melt-flow-rate-polymer-producing metallocene catalyst in the presence of hydrogen in the range of 100 to 50,000 ppm comprising contacting the metallocene catalyst with a sufficient quantity of α,ω-diene monomer such that when the catalyst composition is contacted with propylene monomers under suitable polymerization conditions, the resulting polymer has an MFR in the range of 0.1 to 19 g/10 min.

8. The method of claim 7 wherein the metallocene catalyst is further defined as a zirconium metallocene catalyst.

9. The method of claim 7 wherein the α,ω-diene is present in the range of 10 to 20,000 ppm of the propylene monomers.

10. The method of claim 7 wherein the α,ω-diene monomer is 1,9-decadiene.

11. A method of lowering melt-flow-rate ("MFR") response of a high-melt-flow-rate-polymer-producing zirconium metallocene catalyst in the presence of ethylene monomers comprising contacting the zirconium metallocene catalyst with a sufficient quantity of α,ω-diene monomer such that when the catalyst composition is contacted with propylene monomers under suitable polymerization conditions the resulting polymer has an MFR in the range of 0.1 to 19 g/10 min.

12. The method of claim 11 wherein the α,ω-diene is present in the range of 10 to 20,000 ppm.

13. The method of claim 11 wherein the α,ω-diene monomer is 1,9-decadiene.

14. A method of lowering melt-flow-rate ("MFR") response of a high-melt-flow-rate-polymer-producing metallocene catalyst comprising contacting the metallocene catalyst with α,ω-diene monomer present in the range of 10 to 20,000 ppm, such that when the catalyst composition is contacted with polymerizable reactants comprising propylene monomers under suitable polymerization conditions, the resulting polymer has an MFR in the range of 0.1 to 19 g/10 min; and
an 11% or greater increase in molecular weight distribution.

15. The method of claim 14 wherein the metallocene catalyst is further defined as a zirconium metallocene catalyst.

16. The method of claim 14 wherein the polymerization conditions further includes the presence of 100 to 50,000 ppm of hydrogen.

17. The method of claim 14, wherein the α,ω-diene is selected from the group consisting of 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene.

18. The method of claim 14 wherein the α,ω-diene contains aliphatic, cyclic or aromatic substituents.

19. The method of claim 14 wherein the metallocene catalyst comprises one or more of:
Dimethylsilanylbis(2-methyl-4-phenyl-1-indenyl)ZrCl$_2$;
Dimethylsilanylbis(2-methyl-4,6-diisopropylindenyl) ZrCl$_2$;
Dimethylsilanylbis(2-ethyl-4-phenyl-1-indenyl)ZrCl$_2$;
Dimethylsilanylbis(2-ethyl-4-naphthyl-1-indenyl)ZrCl$_2$,
Phenyl(Methyl)silanylbis(2-methyl-4-phenyl-1-indenyl) ZrCl$_2$
Dimethylsilanylbis(2-methyl-4-(1-naphthyl)-1-indenyl) ZrCl$_2$,
Dimethylsilanylbis(2-methyl-4-(2-naphthyl)-1-indenyl) ZrCl$_2$,
Dimethylsilanylbis(2-methyl-indenyl)ZrCl$_2$,
Dimethylsilanylbis(2-methyl-4,5-diisopropyl-1-indenyl) ZrCl$_2$,
Dimethylsilanylbis(2,4,6-trimethyl-1-indenyl)ZrCl$_2$,
Phenyl(Methyl)silanylbis(2-methyl-4,6-diisopropyl-1-indenyl)ZrCl$_2$,
1,2-Ethandiylbis(2-methyl-4,6-diisopropyl-1-indenyl) ZrCl$_2$,
1,2-Butandiylbis(2-methyl-4,6-diisopropyl-1-indenyl) ZrCl$_2$,
Dimethylsilanylbis(2-methyl-4-ethyl-1-indenyl)ZrCl$_2$,
Dimethylsilanylbis(2-methyl-4-isopropyl-1-indenyl) ZrCl$_2$,
Dimethylsilanylbis(2-methyl-4-t-butyl-1-indenyl)ZrCl$_2$,
Phenyl(Methyl)silanylbis(2-methyl-4-isopropyl-1-indenyl)ZrCl$_2$,
Dimethylsilanylbis(2-ethyl-4-methyl-1-indenyl)ZrCl$_2$,
Dimethylsilanylbis(2,4-dimethyl-1-indenyl)ZrCl$_2$,
Dimethylsilanylbis(2-methyl-4-ethyl-1-indenyl)ZrCl$_2$, and
Dimethylsilanylbis(2-methyl-1-indenyl)ZrCl$_2$.

20. The method of claim 14 wherein the metallocene catalyst is contacted with an activator.

21. The method of claim 20 wherein the activator is an alkyl alumoxane.

22. The method of claim 21 wherein the alkyl alumoxane is methylalumoxane.

23. The method of claim 14 wherein the polymerization conditions are slurry polymerization conditions.

24. The method of claim 14 wherein the polymerizable reactants further comprise one or more of ethylene, $C_2$–$C_{10}$ α-olefins or diolefins.

25. The method of claim 14 wherein the polymerizable reactants further comprise ethylene, butene-1, pentene-1, hexene-1, heptene-1, 4-methyl-1-pentene, 4-methyl-1-hexene, 5-methyl-1-hexene, 1-octene, 1-decene, 1-undecene, 1-dodecene, styrene or mixtures thereof.

26. The method of claim 14 wherein the metallocene catalyst is supported on a porous particulate material.

27. The method of claim 26 wherein the support comprises talc, inorganic oxides, inorganic chlorides, polyolefin compounds, or polymeric compounds.

28. The method of claim 26 wherein the support comprises a porous inorganic oxide metal oxides, where the metal is selected from Groups 2, 3, 4, 5, 13 or 14.

29. The method of claim 26 wherein the support comprises silica, alumina, silica-alumina, or mixtures thereof.

30. The method of claim 26 wherein the support comprises silicon dioxide.

31. The method of claim 26 wherein the support comprises one or more of talc, clay, silica, alumina, magnesia, zirconia, iron oxides, boria, calcium oxide, zinc oxide, barium oxide, thoria, aluminum phosphate gel, polyvinylchloride and substituted polystyrene.

32. A method of lowering melt-flow-rate ("MFR") response of a high-melt-flow-rate-polymer-producing metallocene catalyst comprising contacting the metallocene catalyst with α,ω-diene monomer present in the range of 10 to 20,000 ppm, such that when the catalyst composition is contacted with polymerizable reactants comprising propylene monomers under suitable polymerization conditions, the resulting polymer has an MFR in the range of 0.1 to 19 g/10 min; and
an 11% or greater increase in molecular weight distribution; and
wherein:
a) the α,ω-diene is selected from the group consisting of 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene; and b) the metallocene catalyst comprises one or more of:
Dimethylsilanylbis(2-methyl-4-phenyl-1-indenyl)ZrCl2;
Dimethylsilanylbis(2-methyl-4,6-diisopropylindenyl)ZrCl2;
Dimethylsilanylbis(2-ethyl-4-phenyl-1-indenyl)ZrCl2;
Dimethylsilanylbis(2-ethyl-4-naphthyl-1-indenyl)ZrCl2,
Phenyl(Methyl)silanylbis(2-methyl-4-phenyl-1-indenyl)ZrCl2
Dimethylsilanylbis(2-methyl-4-(1-naphthyl)-1-indenyl)ZrCl2,
Dimethylsilanylbis(2-methyl-4-(2-naphthyl)-1-indenyl)ZrCl2,
Dimethylsilanylbis(2-methyl-indenyl)ZrCl2,
Dimethylsilanylbis(2-methyl-4,5-diisopropyl-1-indenyl)ZrCl2,
Dimethylsilanylbis(2,4,6-trimethyl-1-indenyl)ZrCl2,
Phenyl(Methyl)silanylbis(2-methyl-4,6-diisopropyl-1-indenyl)ZrCl2,
1,2-Ethandiylbis(2-methyl-4,6-diisopropyl-1-indenyl)ZrCl2,
1,2-Butandiylbis(2-methyl-4,6-diisopropyl-1-indenyl)ZrCl2,
Dimethylsilanylbis(2-methyl-4-ethyl-1-indenyl)ZrCl2,
Dimethylsilanylbis(2-methyl-4-isopropyl-1-indenyl)ZrCl2,
Dimethylsilanylbis(2-methyl-4-t-butyl-1-indenyl)ZrCl2,
Phenyl(Methyl)silanylbis(2-methyl-4-isopropyl-1-indenyl)ZrCl2,
Dimethylsilanylbis(2-ethyl-4-methyl-1-indenyl)ZrCl2,
Dimethylsilanylbis(2,4-dimethyl-1-indenyl)ZrCl2,
Dimethylsilanylbis(2-methyl-4-ethyl-1-indenyl)ZrCl2, and
Dimethylsilanylbis(2-methyl-1-indenyl)ZrCl2; and c) the metallocene catalyst is contacted with an alkyl alumoxane; and d) the polymerization conditions are slurry polymerization conditions; and e) wherein the metallocene catalyst is supported on a porous inorganic oxide metal oxide of metals selected from Groups 2, 3, 4, 5, 13 or 14.

33. The method of claim 32 wherein the polymerizable reactants further comprise ethylene, butene-1, pentene-1, hexene-1, heptene-1, 4-methyl-1-pentene, 4-methyl-1-hexene, 5-methyl-1-hexene, 1-octene, 1-decene, 1-undecene, 1-dodecene, styrene or mixtures thereof.

34. A method of lowering melt-flow-rate ("MFR") response of a high-melt-flow-rate-polymer-producing metallocene catalyst comprising contacting the metallocene catalyst and an activator with α,ω-diene monomer present in the range of 10 to 20,000 ppm, such that when the catalyst composition is contacted with polymerizable reactants comprising propylene monomers under suitable polymerization conditions, the resulting polymer has
an MFR in the range of 0.1 to 19 g/10 min; and
an 11% or greater increase in molecular weight distribution.

35. The method of claim 34 wherein the activator is modified methyl alumoxane.

* * * * *